(12) United States Patent
Nam

(10) Patent No.: US 7,773,958 B2
(45) Date of Patent: Aug. 10, 2010

(54) KEY PAD ASSEMBLY AND MOBILE COMMUNICATION TERMINAL HAVING THE SAME

(75) Inventor: Sang-Eun Nam, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 879 days.

(21) Appl. No.: 11/467,518

(22) Filed: Aug. 25, 2006

(65) Prior Publication Data

US 2007/0046636 A1 Mar. 1, 2007

(30) Foreign Application Priority Data

Aug. 26, 2005 (KR) .................. 10-2005-0079084

(51) Int. Cl.
*H04B 1/38* (2006.01)
(52) U.S. Cl. ................ 455/90.3; 455/550.1; 455/575.5; 200/314; 200/305
(58) Field of Classification Search ................ 455/90.3, 455/550.1, 575.1
See application file for complete search history.

(56) References Cited

U.S. PATENT DOCUMENTS

2004/0071285 A1 4/2004 Satoh et al.

2007/0015533 A1* 1/2007 Siddiqui et al. .......... 455/550.1

FOREIGN PATENT DOCUMENTS

| GB | 2 402 650 A | 12/2004 |
|---|---|---|
| JP | 2001-245032 | 9/2001 |
| JP | 2003-234039 | 8/2003 |
| JP | 2004-159206 | 6/2004 |
| JP | 2006-033203 | 2/2006 |
| JP | 2006-340077 | 12/2006 |

* cited by examiner

*Primary Examiner*—Yuwen Pan
(74) *Attorney, Agent, or Firm*—Lee, Hong, Degerman & Kang & Waimey

(57) ABSTRACT

A key pad assembly and a mobile communication terminal having the same. The key pad assembly comprises: a key pad installed at a front surface of a cover so as to be exposed outwardly; a switching unit arranged at a rear surface of the cover for generating a signal when the key pad is pressed; a signal transmitting unit electrically connected to the switching unit below the switching unit, for transmitting a signal generated from the switching unit; and a supporting plate arranged below the signal transmitting unit and having a guiding portion for inducing the signal transmitting unit to be bent in a direction spaced from a lower surface of the cover, for supporting the signal transmitting unit towards the cover. As the key pad assembly is implemented to be slim, a spatial efficiency of the mobile communication terminal is increased.

16 Claims, 4 Drawing Sheets

KEY PAD ASSEMBLY AND MOBILE COMMUNICATION TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2005-0079084, filed on Aug. 26, 2005, the contents of which is hereby incorporated by reference herein in its entirety.

BACKGROUND OF THE INVENTION

1. Field of the Invention

The present invention relates to a key pad assembly and a mobile communication terminal having the same, and more particularly, to a key pad assembly mounted at a mobile communication terminal so as to be exposed outwardly and pressed by a user for implementation of a specific function, and a mobile communication terminal having the same.

2. Description of the Background Art

A mobile communication terminal is a portable wireless communication device. The mobile communication terminal includes a bar type, a flip type that a cover is rotatably mounted at a bar-shaped key pad, a slide type that a cover is opened and closed by a sliding, and a folder type that a display portion such as a liquid crystal display (LCD) and a key pad portion are separately opened and closed on a body portion. Recently, the mobile communication terminal includes a watch phone having a watch shape.

Even if the mobile communication terminal has various functions or various forms, a portable characteristic of the mobile communication terminal has to be maintained.

When the mobile communication terminal is provided with each kind of multimedia function such as an image capturing function, a music reproduction function, an electronic mail function, etc., each device for implementing the respective functions has to be provided under a state that the mobile communication terminal is implemented to be slim.

Among the several functions, the music reproduction function will be explained.

Generally, the mobile communication terminal reproduces a music file such as an MP3 file. In order to reproduce the music file, a user has to input a signal for reproduction to a controller such as a printed circuit board (PCB) by pressing a key pad.

However, in the folder type mobile communication terminal, since it is difficult to rotatably open a folder portion on a body portion, a key pad assembly is mounted not only at the body portion but also at the folder portion so as to be exposed outwardly. The key pad assembly arranged on an outer surface of the folder portion serves to control a music playback function, which is called as a music on demand (MOD) key.

One drawback of putting the key (or MOD key) pad assembly on the outer surface of the folder portion is that the overall thickness of mobile communication terminal of related art is likely to be significantly increased. As more users want their mobile terminal to be slimmer, the key pad assembly and the folder housing of the mobile terminal of related arts are assembled in such a close relationship or some portion of the folder housing is removed to achieve the slim configuration. Thus, there is another drawback that the manufacturing of the mobile terminal incorporating the key pad assembly into the folder portion according to the above cited approach in the related arts results in the increased interference between the key pad assembly and the inner surface of the housing, and poor structural integrity due to removal of some portion of the folder housing.

Thus, there remains a need for the key pad assembly of the mobile communication terminal capable of having a slim configuration with significantly strong structural integrity.

BRIEF DESCRIPTION OF THE INVENTION

Therefore, an object of the present invention is to provide a key pad assembly implemented to be slim thus requiring a narrow installation space at a mobile communication terminal and not degrading another part of the mobile communication terminal, and a mobile communication terminal having the same.

To achieve these and other advantages and in accordance with the purpose of the present invention, as embodied and broadly described herein, there is provided a key pad assembly, comprising: a key pad; a switching unit; a signal transmitting unit; and a supporting plate.

The key pad is installed at a front surface of a cover so as to be outwardly exposed and pressed, and the switching unit is arranged at a rear surface of the cover so as to be positioned below the key pad. The switching unit generates a specific signal accordingly as a user presses the key pad. The signal transmitting unit is electrically connected to the switching unit, and transmits a signal generated from the switching unit to a controller, such as a printed circuit board (PCB). The signal transmitting unit is implemented as a flexible printed circuit board (FPCB) for example, and has a soft property. The supporting plate supports the key pad, the switching unit, and the signal transmitting unit sequentially arranged, and is provided with a guiding portion at a position corresponding to an extended portion of the signal transmitting unit.

The guiding portion is a cut-out portion formed accordingly as the supporting plate is partially cut-out, and induces the extended portion of the signal transmitting unit to be bent so as to be more spaced from the cover than a plane of the supporting plate. Accordingly, the extended portion of the signal transmitting unit is not interfered with the rear surface of the cover. When a soldering portion (a portion formed by soldering a wire so as to be electrically connected to a speaker), a portion protruded from the extended portion is formed, an interference between the soldering portion and the cover is solved by the guiding portion.

To achieve these and other advantages and in accordance with the purpose of the present invention, as embodied and broadly described herein, there is also provided a mobile communication terminal, comprising: a terminal body; and a key pad assembly mounted at the terminal body for inputting a signal. The terminal body can comprise a body portion, and a folder portion connected to the body portion and rotatably opened and closed. The folder portion includes an upper cover and a lower cover forming an inner space therebetween.

The key pad assembly is arranged at the inner space of the folder portion, and the key pad of the key pad assembly is exposed outwardly through the upper cover thus to generate a signal at the switching unit when pressed by a user. The supporting plate coupled to the lower cover for pressurizing the key pad assembly towards the upper cover is provided with a guiding portion, thereby preventing an interference between the signal transmitting unit and the upper cover. Accordingly, a groove for preventing an interference between the signal transmitting unit and the upper cover need not be formed at the upper cover. That is, since the key pad assembly is slim, it enhances a spatial utilization of the mobile communication terminal at the time of being installed at the mobile communication terminal.

The signal transmitting unit has a plurality of separated forms, and the guiding portion of the supporting plate can be formed to partially bend the plural signal transmitting unit so as not to degrade a supporting function of the supporting plate.

The key pad assembly is mounted at the folder portion so as to be exposed outwardly, and serves to control a music reproduction function, which is called as a music on demand (MOD) key assembly. However, the key pad assembly can be used for another purpose as well as for a music reproduction function.

Even if the present invention was applied to a folder type mobile communication terminal, it can be applied to various mobile communication terminals such as a bar type, a flip type, a slide type, etc.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
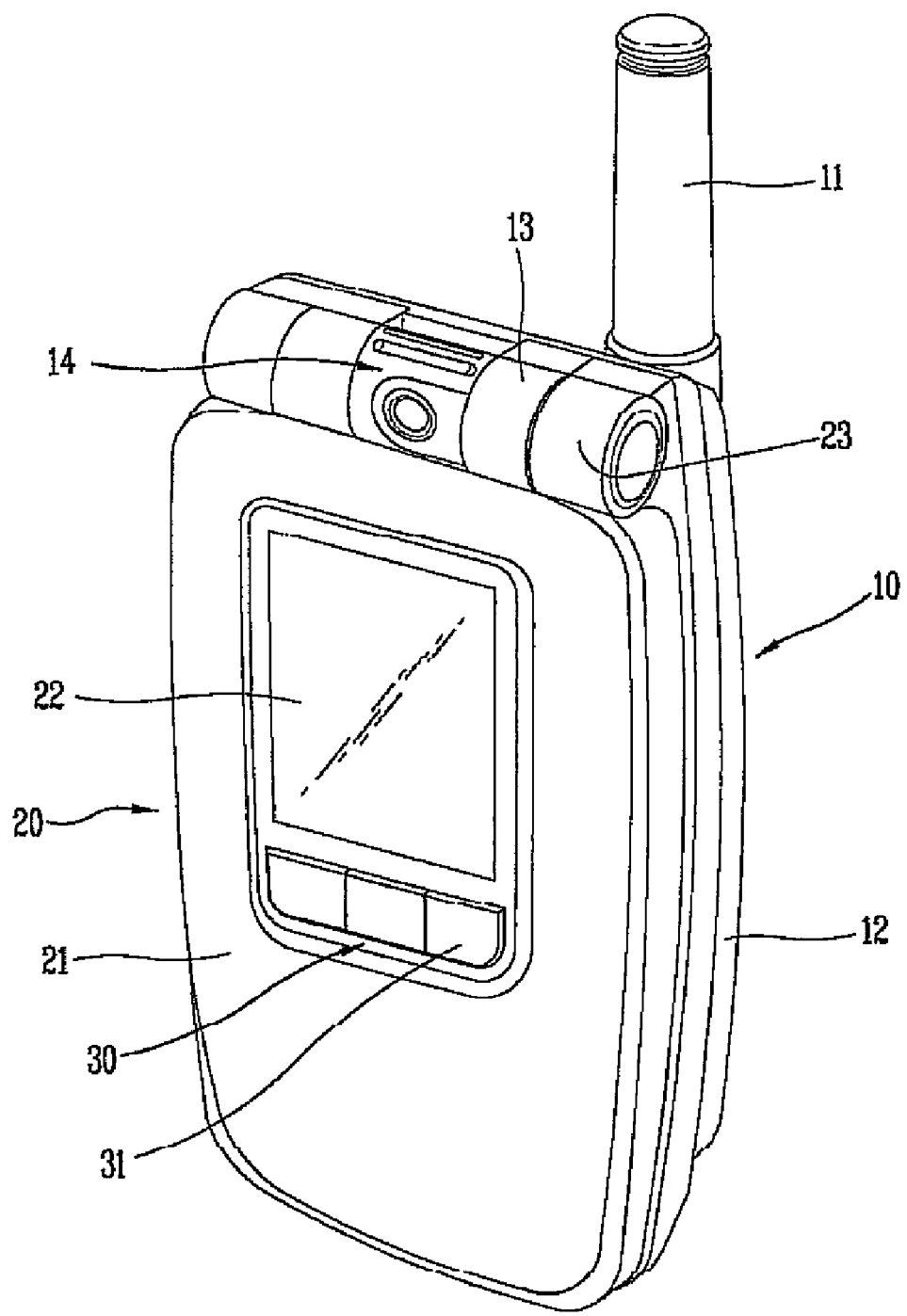
FIG. 1 is a perspective view showing a mobile communication terminal according to a first embodiment of the present invention.

FIG. 1 is a perspective view showing a mobile communication terminal according to a first embodiment of the present invention.

As shown, a mobile communication terminal according to a first embodiment of the present invention comprises a terminal body 10 and 20, and a key pad assembly 30 mounted at the terminal body and pressed by a user.

The terminal body 10 and 20 includes a body portion 10, and a folder portion 20 rotatably connected to the body portion 10. The body portion 10 is provided with an antenna 11 for transceiving a wireless frequency, and a battery 12 for supplying power. A camera 14 is rotatably mounted at a body hinge 13 protruded from one edge of the body portion 10. The folder portion 20 includes a folder cover 21 for covering inner components, a sub-display 22 mounted at the folder cover 21 for outputting visual information, and a folder hinge 23 formed at one edge of the folder portion 20 in correspondence with the body hinge 13 of the body portion 10 and coupled to body hinge 13 for opening and closing the folder portion 20 on the body portion 10. The sub-display 22 is provided separately from a main display (not shown) formed at an inner surface of the folder portion 20, that is, a surface of the folder portion 20 contacting the body portion 10. Therefore, even when the folder portion 20 is positioned on the body portion 10 (closed state), the user can easily certify necessary information. As the main display and the sub-display, a liquid crystal display (LCD) is used.

The key pad assembly 30 is mounted at the inner space of the folder portion 20 so that the key pad 31 can be exposed outside the folder portion 20 separately from a key pad assembly 30 exposed at a front surface of the body portion 10 which contacts the folder portion 20. The key pad assembly 30 serves to input a music reproduction function, etc. under a state that the mobile communication terminal is in a closed state, and is called as a music on demand (MOD) key assembly.

Figure 2:
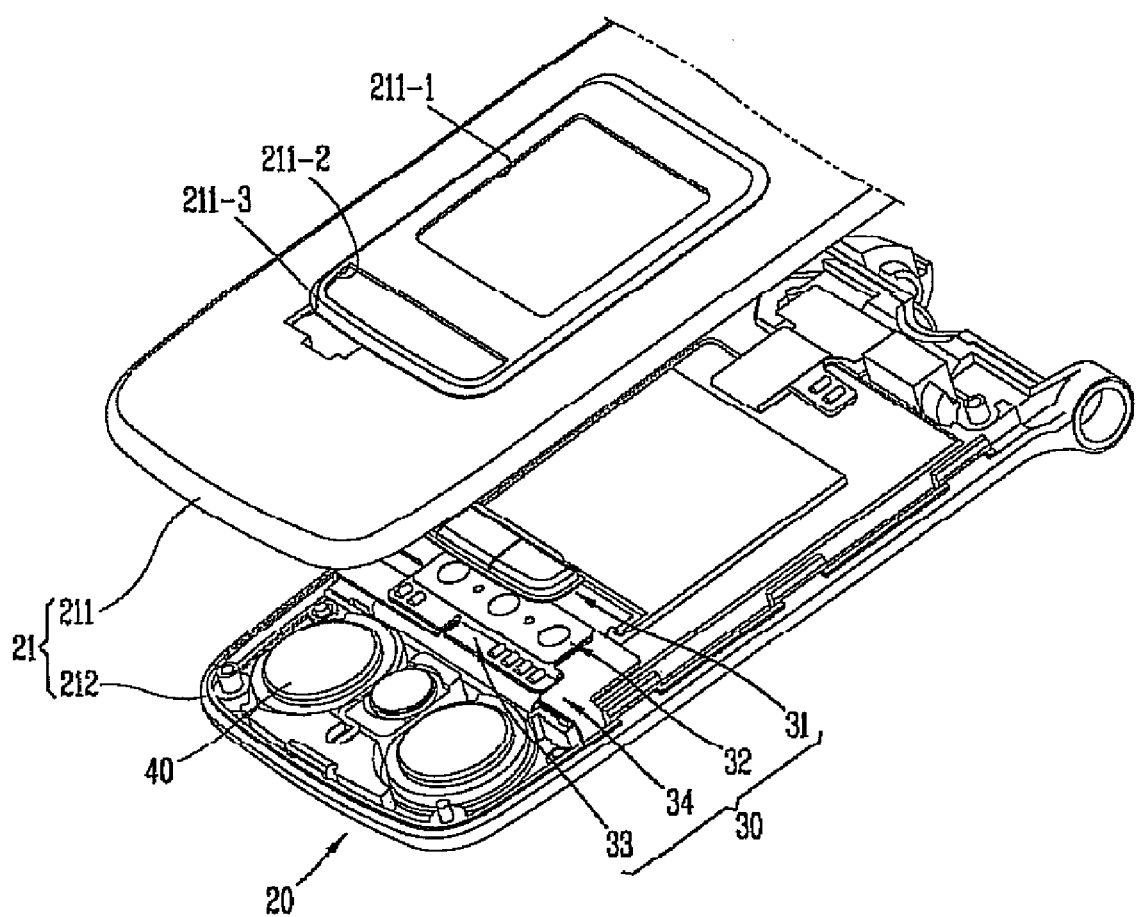
FIG. 2 is a partial perspective view showing a folder portion and a key pad assembly mounted at the folder portion of FIG. 1.

FIG. 2 is a partial perspective view showing a folder portion and a key pad assembly mounted at the folder portion of FIG. 1.

As shown, a folder cover 21 of the folder portion 20 is composed of an upper cover 211 and a lower cover 212. The upper cover 211 and the lower cover 212 form an inner space therebetween, and the key pad assembly 30 is mounted at the inner space.

The upper cover 211 is respectively provided with a display hole 211-1 for mounting a sub-display 22, a key pad hole 211-2 for mounting the key pad 31 of the key pad assembly 30, and a soldering portion hole 211-3 for protruding a soldering portion. The soldering portion hole 211-3 is not exposed outwardly by a cap (not shown) (refer to FIG. 1).

The key pad assembly 30 and a speaker 40 can be mounted at the lower cover 212. The supporting plate 34 of the key pad assembly 30 is mounted at the lower cover 212, and pressurizes the key pad 31, the switching unit 32, and the signal transmitting unit 33 deposited thereon towards the upper cover 211.

The key pad assembly 30 is arranged in parallel with the upper cover 211 and the lower cover 212. The key pad assembly 30 will be explained in more detail with reference to FIG. 3.

Figure 3:
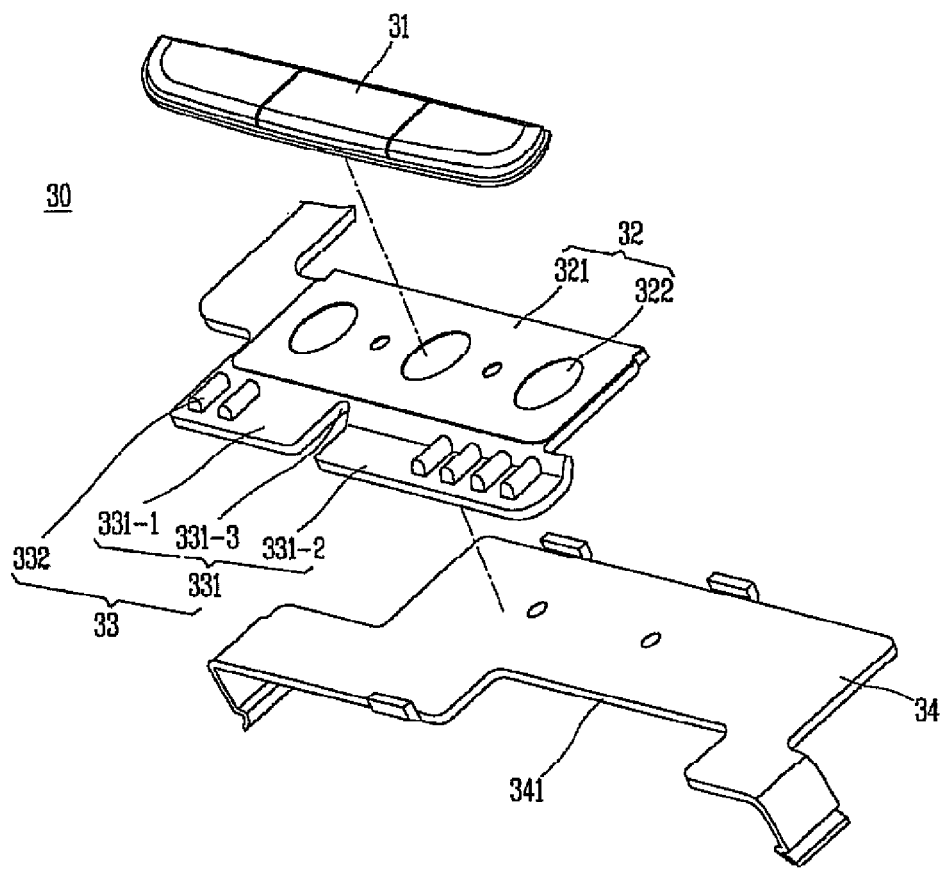
FIG. 3 is a partial perspective view showing the key pad assembly of FIG. 2.

FIG. 3 is a partial perspective view showing the key pad assembly of FIG. 2.

As shown, the key pad assembly 30 according to the first embodiment of the present invention comprises the key pad 31, the switching unit 32, the signal transmitting unit 33, and the supporting plate 34.

The key pad 31 is pressed by a user for implementation of a specific function, and is called as a MOD key.

The switching unit or actuator unit 32 generates a specific signal accordingly as the key pad 31 is pressed by the user. The switching unit 32 includes a circuit board 321, and a switch or actuator 322 electrically connected to the circuit board 321 and generating a signal at the circuit board 321 when the key pad 31 is pressed. For example, a dome shaped switch can be used.

The signal transmitting unit 33 is arranged below the switching unit 32, and transmits a signal generated from the switching unit 32 to a controller, for example, a printed circuit board (not shown) mounted at the body portion 10 of FIG. 1. Then, the controller performs a specific function accordingly as the user presses the key pad assembly 30. The signal transmitting unit 33 can be implemented as a flexible printed circuit board (FPCB) electrically connected to the switching unit 32. The signal transmitting unit 33 includes an extended portion 331 extending from the switching unit 32 arranged thereon, and a soldering portion 332 protruding from the extended portion 331.

The extended portion 331 of the signal transmitting unit 33 is divided into at least two parts, for example, a first portion 331-1 and a second portion 331-2 by a division portion 331-3. The soldering portion 332 is arranged on the extended portion 331 in plurality, and is soldered in order to electrically connect the signal transmitting unit 33, the speaker 40, etc. to one another.

The supporting plate 34 is arranged below the signal transmitting unit 33, and has a plate shape. The supporting plate 34 for supporting the key pad 31, the switching unit 32, and the signal transmitting unit 33 is formed of a material having a rigid characteristics. A guiding portion such as a cut-out portion 341 is configured to be formed at one side of the supporting plate 34 in correspondence with the extended portion 331 of the signal transmitting unit 33. The cut-out portion 341 is a cut-out in a longitudinal direction of the supporting plate 34 (right and left directions in drawing) in correspondence with the second portion 331-2. As the result, the extended portion 331 having a flexible characteristics, more concretely, the second portion 331-2 is bent towards a direction spaced from the key pad 31 by the cut-out portion 341. A coupled state of the key pad assembly 30 will be explained with reference to FIG. 4.

Figure 4:
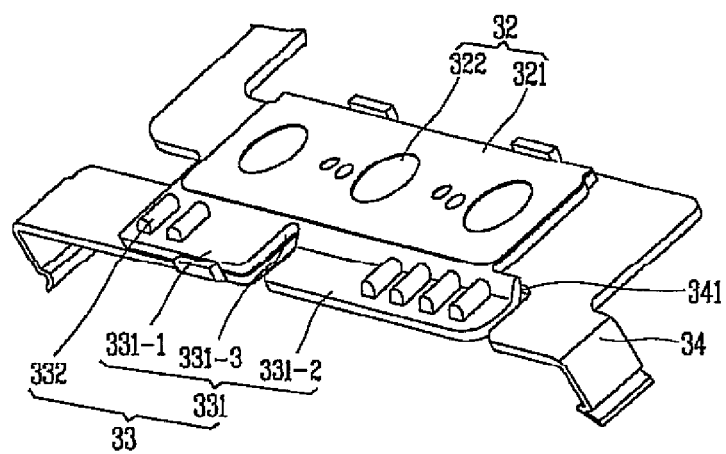
FIG. 4 is a perspective view showing a coupled state of the key pad assembly except a key pad of FIG. 3.

FIG. 4 is a perspective view showing a coupled state of the key pad assembly except a key pad of FIG. 3.

As shown, the signal transmitting unit 33 on which the switching unit 32 is arranged is provided on the supporting plate 34. Herein, the soldering portion 332 arranged on the first portion 331-1 is protruded thus to determine a height of the key pad assembly 30. However, the soldering portion 332 arranged on the second portion 331-2 is positioned on the same plane as the supporting plate 34 accordingly as the second portion 331-2 is bent by the cut-out portion 341 of the supporting plate 34.

That is, the position of the soldering portion 332 which influences on the height of the key pad assembly 30 can be lowered by forming the cut-out portion 341 at the supporting plate 34 as a guiding portion.

Figure 5:
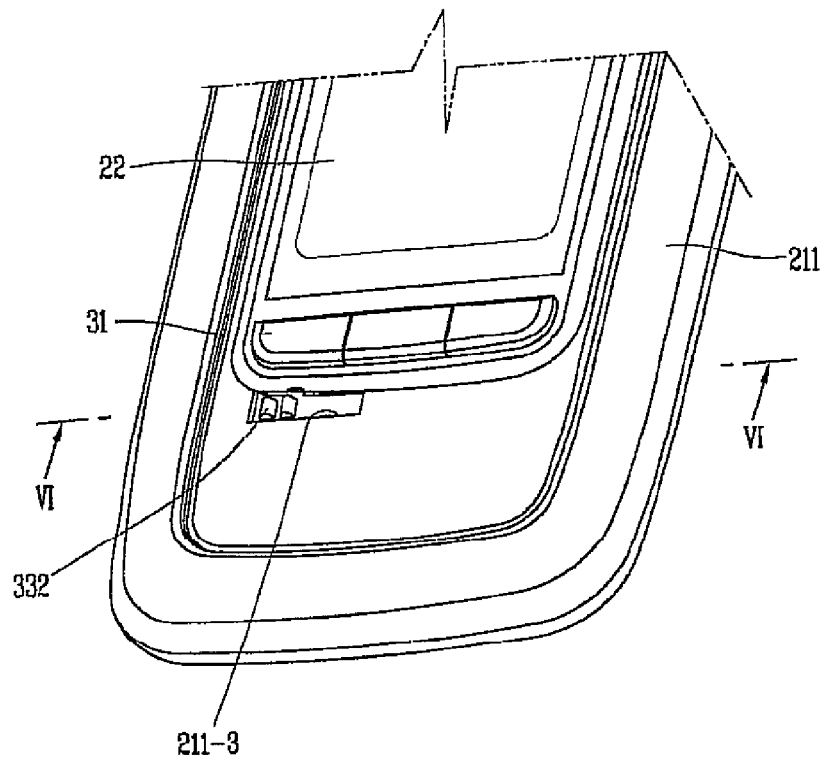
FIG. 5 is a perspective view showing the folder portion of FIG. 2.
Figure 6:
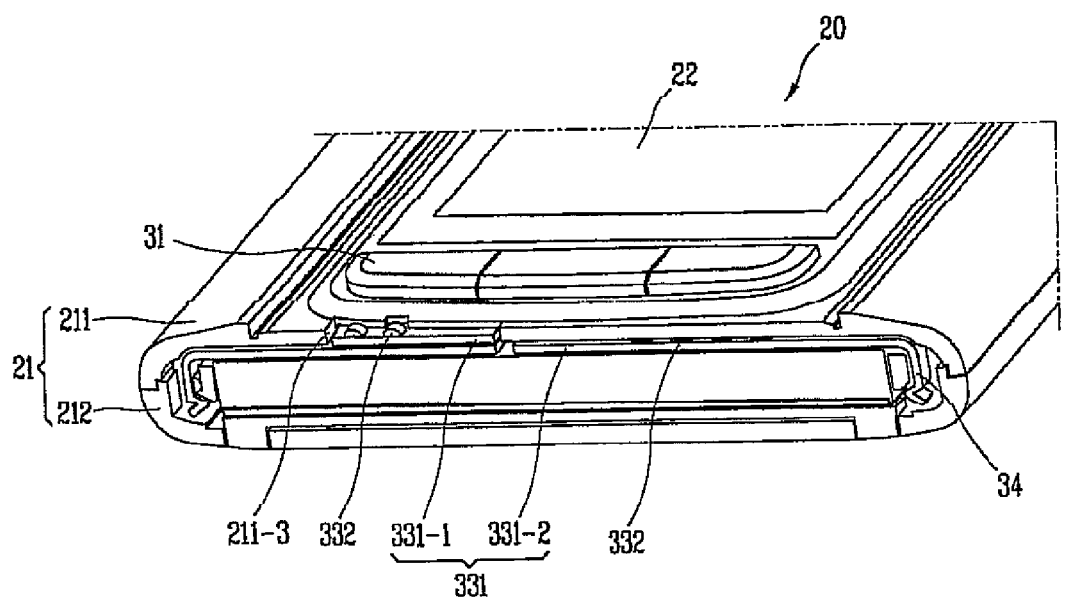
FIG. 6 is a sectional view taken along line VI-VI of FIG. 5.

FIG. 5 is a perspective view showing the folder portion of FIG. 2, and FIG. 6 is a sectional view taken along line VI-VI of FIG. 5.

The soldering portion 332 of the signal transmitting unit 33 of the key pad assembly 30 is one factor to determined the height of the key pad assembly 30. When the key pad assembly 30 is mounted at the folder portion 20 having a limited thickness, the soldering portion hole 211-3 has to be formed at the folder portion 20 for a slim implementation of the folder portion 20.

However, as long as the soldering portion 332 is formed at the second portion 331-2 so as to be spaced from the upper cover 211 of the folder portion 20 by the cut-out portion 341, the soldering portion hole 211-3 for mounting the soldering portion 332 need not be formed.

That is, an area of the soldering portion hole 211-3 occupied on the upper cover 211 is decreased or is not generated, thereby increasing an intensity of the upper cover 211. Even if the intensity of the upper cover 211 is increased, the upper cover 211 is not thickened due to the following reason. Whereas the soldering portion 332 serves to implement the upper cover 211 to be thin or is provided with the soldering portion hole 211-3 in the related art, the cut-out portion 341 itself serves to arrange the soldering portion 332 not to be interfered with the upper cover 211 in the present invention.

As aforementioned, in the key pad assembly according to one aspect of the present invention, the guiding portion for bending the signal transmitting unit that determines the entire height of the key pad assembly is formed at the supporting plate, thereby minimizing the entire height of the key pad assembly. Furthermore, since the mobile communication terminal according to another aspect of the present invention has the key pad assembly, the terminal body (especially, the upper cover of the folder portion) can be slim when the key pad assembly is installed at the mobile communication terminal or a groove need not be formed at the terminal body. As the result, the terminal body is easily fabricated and its intensity is not lowered.

In the present invention, the guiding portion formed at the supporting plate for bending the extended portion 331 is implemented as the cut-out portion 341. However, it is also possible to implement another guiding portion. For instance, when the supporting plate 34 has a certain thickness, the guiding portion can be implemented as a groove having a size enough to position the extended portion 331 not as the cut-out portion 341.

In the present invention, the extended portion 331 is divided into the first portion 331-1 and the second portion 331-2, and only the second portion 331-2 is bent. When the supporting plate 34 is completely cut-out up to a part corresponding to the first portion 331-1, the supporting plate 34 is structurally weakened. However, if the supporting plate 34 is implemented as another form and thus the intensity of the supporting plate 34 is not lowered, a guiding portion having a size corresponding to the entire size of the extended portion 331 where the soldering portion 332 is formed can be formed thereby to entirely bend the extended portion 331. Herein, the soldering portion hole 211-3 need not be formed at the upper cover 211.

In accordance with the present invention, an assembly for a key input unit can comprise a support plate; and a flexible printed circuit board (PCB) attached on the support plate, wherein the flexible PCB has a first section and a second section both with solder bumps thereon, the first and second sections being offset in a planar manner with respect to each other. The first and second sections are offset due to a stepped configuration with respect to each other and the support plate has a notch that receives the second section. The flexible PCB is attached on the support plate through bonding, while no bonding exists around the notch to allow the second section to be bent or inserted into the notch. The assembly further comprises a housing attached onto the flexible PCB, the housing having a first slot located over the first section and a second slot located over the second section to expose the solder bumps to allow electrical connection thereto, and the housing is formed by a molding process. The first and second slots are separated by a bridge portion formed therebetween on the housing. The bridge portion is configured to be positioned to mate with the second section. The assembly further comprises a plurality of buttons operatively attached at the housing, each button located over a respective actuator formed on the flexible PCB. The buttons provide multimedia controls that are exposed on a folder portion of a mobile terminal. The assembly can also comprise a first and a second outer cover attached onto the housing to respectively cover the first and second slots, and a housing placed over the flexible PCB, the inner cover having relatively small openings located above the first and second sections to expose the solder bumps to allow electrical connection thereto.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A key pad assembly comprising:
   a key pad, in operational relationship with a pressure activated key, installed on a cover having an externally facing front surface and an internally facing rear surface, such that the cover at least partially houses:
   a switching unit,
   a signal transmitting unit, and
   a supporting plate,
   wherein the rear surface of the cover faces the switching unit and the signal transmitting unit,
   wherein the key pad once installed on the front surface of the cover works in cooperation with the switching unit so that in response to pressure applied on the pressure activated key, the switching unit activates the signal transmitting unit to generate a signal,
   wherein the switching unit and the signal transmitting unit are substantially positioned over the supporting plate, and the cover is positioned over the switching unit and the signal transmitting unit, and the key pad is positioned over an area of the cover corresponding to the switching unit, so that application of pressure on the pressure activated key results in application of pressure to the switching unit and in turn said pressure is applied to the supporting plate which prevents the cover from caving inward as the result of the applied pressure,
   wherein the signal transmitting unit extends from the switching unit in a first direction in a way that a first portion of the signal transmitting unit canteliverly extends in a first plane same as a plane of the switching unit over a first portion of the supporting plate, and a second portion of the signal transmitting unit extends in a second plane, wherein the second plane is not the same as the first plane, such that the second portion of the signal transmitting unit is at least partially disposed in a cavity formed in the supporting plate when the cover is assembled over the switching unit and the signal transmitting unit,
   wherein an aperture formed in the cover corresponds to the first portion of the signal transmitting unit not disposed in said cavity, and the first portion of the signal transmitting unit is at least partially exposed through said aperture when the cover is assembled over the signal transmitting unit, and
   wherein size of the cavity formed in the supporting plate is configured to maintain structural integrity of the supporting plate in response to user applied pressure on the pressure activated key.

2. The key pad assembly of claim 1, wherein the cavity in the supporting plate is formed as a cut-out corresponding to the second portion of the signal transmitting unit.

3. The key pad assembly of claim 1, further comprising a soldering portion formed at the signal transmitting unit and arranged on the same plane as the supporting plate by a partial bending of the signal transmitting unit, for electrically connecting the signal transmitting unit and a speaker.

4. The key pad assembly of claim 1, wherein the cavity in the supporting plate is formed on the supporting plate in a longitudinal direction.

5. The key pad assembly of claim 1, wherein the key pad, the switching unit, the signal transmitting unit, and the supporting plate are arranged to be in parallel with the cover.

6. A mobile communication terminal, comprising:
   a terminal body; and
   a key pad assembly mounted at the terminal body for inputting a signal, the key pad assembly comprising:
   a key pad, having a pressure activated key, installed on a cover having an externally facing front surface and an internally facing rear surface, such that the cover at least partially houses a switching unit, a signal transmitting unit and a supporting plate, wherein the rear surface of the cover faces the switching unit and the signal transmitting unit, and wherein the key pad once installed on the front surface of the cover works in cooperation with the switching unit so that in response to pressure applied on the pressure activated key, the switching unit activates the signal transmitting unit to generate a signal,
   wherein the switching unit and the signal transmitting unit are substantially positioned over the supporting plate, and the cover is positioned over the switching unit and the signal transmitting unit, and the key pad is positioned over an area of the cover corresponding to the switching unit, so that application of pressure on the pressure activated key results in application of pressure to the switching unit and in turn said pressure is applied to the supporting plate which prevents the cover from caving inward as the result of the applied pressure,
   wherein the signal transmitting unit extends from the switching unit in a first direction in a way that a first portion of the signal transmitting unit canteliverly extends in a first plane same as a plane of the switching unit over a first portion of the supporting plate, and a second portion of the signal transmitting unit extends in a second plane, wherein the second plane is not the same as the first plane, such that the second portion of the signal transmitting unit is at least partially disposed in a cavity formed in the supporting plate when the cover is assembled over the switching unit and the signal transmitting unit, and wherein an aperture formed in the cover corresponds to the first portion of the signal transmitting unit not disposed in said cavity, and the first portion of the signal transmitting unit is at least partially exposed through said aperture when the cover is assembled over the signal transmitting unit, wherein size of the cavity formed in the supporting plate is configured to maintain structural integrity of the supporting plate in response to user applied pressure on the pressure activated key.

7. The mobile communication terminal of claim 6, wherein the cavity in the supporting plate is implemented as a cut-out portion cut-out at the supporting plate in correspondence with a portion of the signal transmitting unit.

8. The mobile communication terminal of claim 6, further comprising a soldering portion formed at the signal transmitting unit and arranged on the same plane as the supporting plate by a partial bending of the signal transmitting unit, the soldering portion providing an electrical connection between the signal transmitting unit and a speaker.

9. The mobile communication terminal of claim 6, wherein the cavity in the supporting plate is formed in a longitudinal direction of the supporting plate.

10. The mobile communication terminal of claim 6, wherein the key pad, the switching unit, the signal transmitting unit, and the supporting plate are arranged to be in parallel with the terminal body.

11. A mobile communication terminal, comprising:
a terminal body;
a cover body moveable between an open and closed position with respect to the terminal body, the cover body comprising an upper cover and a lower cover to form an inner space therebetween when the upper cover and lower cover are coupled to each other; and
a key pad assembly mounted at the folder portion for inputting a signal by a pressing operation, the key pad assembly comprising:
a key pad, having a pressure activated key, installed on a cover having an externally facing front surface and an internally facing rear surface, such that the cover at least partially houses a switching unit, a signal transmitting unit and a supporting plate, wherein the rear surface of the cover faces the switching unit and the signal transmitting unit, and wherein the key pad once installed on the front surface of the cover works in cooperation with the switching unit so that in response to pressure applied on the pressure activated key, the switching unit activates the signal transmitting unit to generate a signal,
wherein the switching unit and the signal transmitting unit are substantially positioned over the supporting plate, and the cover is positioned over the switching unit and the signal transmitting unit, and the key pad is positioned over an area of the cover corresponding to the switching unit, so that application of pressure on the pressure activated key results in application of pressure to the switching unit and in turn said pressure is applied to the supporting plate which prevents the cover from caving inward as the result of the applied pressure,
wherein the signal transmitting unit extends from the switching unit in a first direction in a way that a first portion of the signal transmitting unit canteliverly extends in a first plane same as a plane of the switching unit over a first portion of the supporting plate, and a second portion of the signal transmitting unit extends in a second plane, wherein the second plane is not the same as the first plane, such that the second portion of the signal transmitting unit is at least partially disposed in a cavity formed in the supporting plate when the cover is assembled over the switching unit and the signal transmitting unit, and wherein an aperture formed in the cover corresponds to the first portion of the signal transmitting unit not disposed in said cavity, and the first portion of the signal transmitting unit is at least partially exposed through said aperture when the cover is assembled over the signal transmitting unit, wherein size of the cavity formed in the supporting plate is configured to maintain structural integrity of the supporting plate in response to user applied pressure on the pressure activated key.

12. The mobile communication terminal of claim 11, wherein the cavity in the supporting plate is implemented as a cut-out portion at the supporting plate in correspondence with a portion of the signal transmitting unit.

13. The mobile communication terminal of claim 11, further comprising a soldering portion formed at the signal transmitting unit and arranged on the same plane as the supporting plate by a partial bending of the signal transmitting unit, for electrically connecting the signal transmitting unit and a speaker.

14. The mobile communication terminal of claim 11, wherein the cavity in the supporting plate is formed in a longitudinal direction of the supporting plate.

15. The mobile communication terminal of claim 11, wherein the supporting plate is coupled to the lower cover, and supports the key pad towards the upper cover.

16. The mobile communication terminal of claim 11, wherein the switching unit comprises:
a circuit board; and
a switch mounted on the circuit board and electrically connected to the circuit board when the key pad is pressed, for generating a signal.

* * * * *